(12) United States Patent
Nagafuchi et al.

(10) Patent No.: US 11,376,634 B2
(45) Date of Patent: Jul. 5, 2022

(54) ARTICLE MANAGEMENT DEVICE, ARTICLE MANAGEMENT SYSTEM, AND COMPUTER-READABLE STORAGE MEDIUM

(71) Applicants: Kabushiki Kaisha Toshiba, Minato-ku (JP); Toshiba Infrastructure Systems & Solutions Corporation, Kawasaki (JP)

(72) Inventors: Shota Nagafuchi, Tokyo (JP); Hidetaka Kojima, Tokyo (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 263 days.

(21) Appl. No.: 16/742,946

(22) Filed: Jan. 15, 2020

(65) Prior Publication Data

US 2020/0261945 A1 Aug. 20, 2020

(30) Foreign Application Priority Data

Feb. 15, 2019 (JP) .............................. JP2019-025732

(51) Int. Cl.
*B07C 3/12* (2006.01)
*B07C 3/08* (2006.01)
(Continued)

(52) U.S. Cl.
CPC .................. *B07C 3/12* (2013.01); *B07C 3/08* (2013.01); *B07C 5/3412* (2013.01);
(Continued)

(58) Field of Classification Search
CPC .......... B07C 5/3422; B07C 1/10; B07C 5/36; B07C 5/16; B07C 3/12; B07C 3/08; B07C 5/3412; G05B 19/4183; G05B 2219/45047
See application file for complete search history.

(56) References Cited

U.S. PATENT DOCUMENTS 6,892,890 B2 * 5/2005 Dominguez .......... B07C 5/3412
209/559
9,108,224 B2 * 8/2015 Schererz ................... B07C 3/00
(Continued)

FOREIGN PATENT DOCUMENTS

CN 110238078 A * 9/2019
DE 10 2811 088 096 A1 1/2013
(Continued)

OTHER PUBLICATIONS

Russian Office Action dated Jul. 14, 2020 in Russian Patent Application No. 2020106126/28(009462) (with English language translation), 15 pages.
(Continued)

*Primary Examiner* — Patrick H Mackey
(74) *Attorney, Agent, or Firm* — Oblon, McClelland, Maier & Neustadt, L.L.P.

(57) ABSTRACT

According to one embodiment, an article management device includes a receiver, a processor, and a transmitter. The receiver is configured to receive article measurement information. The processor is configured to select a first divergence control signal or a second divergence control signal based on the article measurement information, the first divergence control signal being for forwarding the article to a sorter configured to sort the article according to sorting destination information corresponding to the article, the second divergence control signal being for forwarding the article to a carrier. The transmitter is configured to transmit the first or the second divergence control signal to a diverger configured to forward the article toward the sorter or the carrier.

7 Claims, 7 Drawing Sheets

(51) Int. Cl.
*B07C 5/34* (2006.01)
*B07C 5/342* (2006.01)
*G05B 19/418* (2006.01)

(52) U.S. Cl.
CPC ........ *B07C 5/3422* (2013.01); *G05B 19/4183* (2013.01); *G05B 2219/45047* (2013.01)

(56) References Cited

U.S. PATENT DOCUMENTS

| | | |
|---|---|---|
| 9,987,665 B2 * | 6/2018 | Zatopek .................... B07C 7/00 |
| 2014/0166553 A1 * | 6/2014 | Enenkel ................. B65G 65/00 |
| | | 209/645 |
| 2018/0118462 A1 * | 5/2018 | Zevenbergen ....... G06Q 10/087 |
| 2019/0111454 A1 * | 4/2019 | Sezaki ...................... B07C 5/38 |
| 2020/0086350 A1 | 3/2020 | Miette et al. |
| 2020/0231386 A1 * | 7/2020 | Shiu ...................... B66F 9/0755 |
| 2021/0031240 A1 * | 2/2021 | Carpenter ................ B07C 5/36 |

FOREIGN PATENT DOCUMENTS

| | | |
|---|---|---|
| DE | 10 2015 116 741 A1 | 4/2017 |
| JP | 2003-171001 A | 6/2003 |
| JP | 2017-019588 A | 1/2017 |
| JP | 2018-052671 A | 4/2018 |
| WO | WO 2018/115611 A1 | 6/2018 |

OTHER PUBLICATIONS

Extended European Search Report dated Sep. 24, 2020 in European Patent Applcation No. 20150671.4, 10 pages.

* cited by examiner

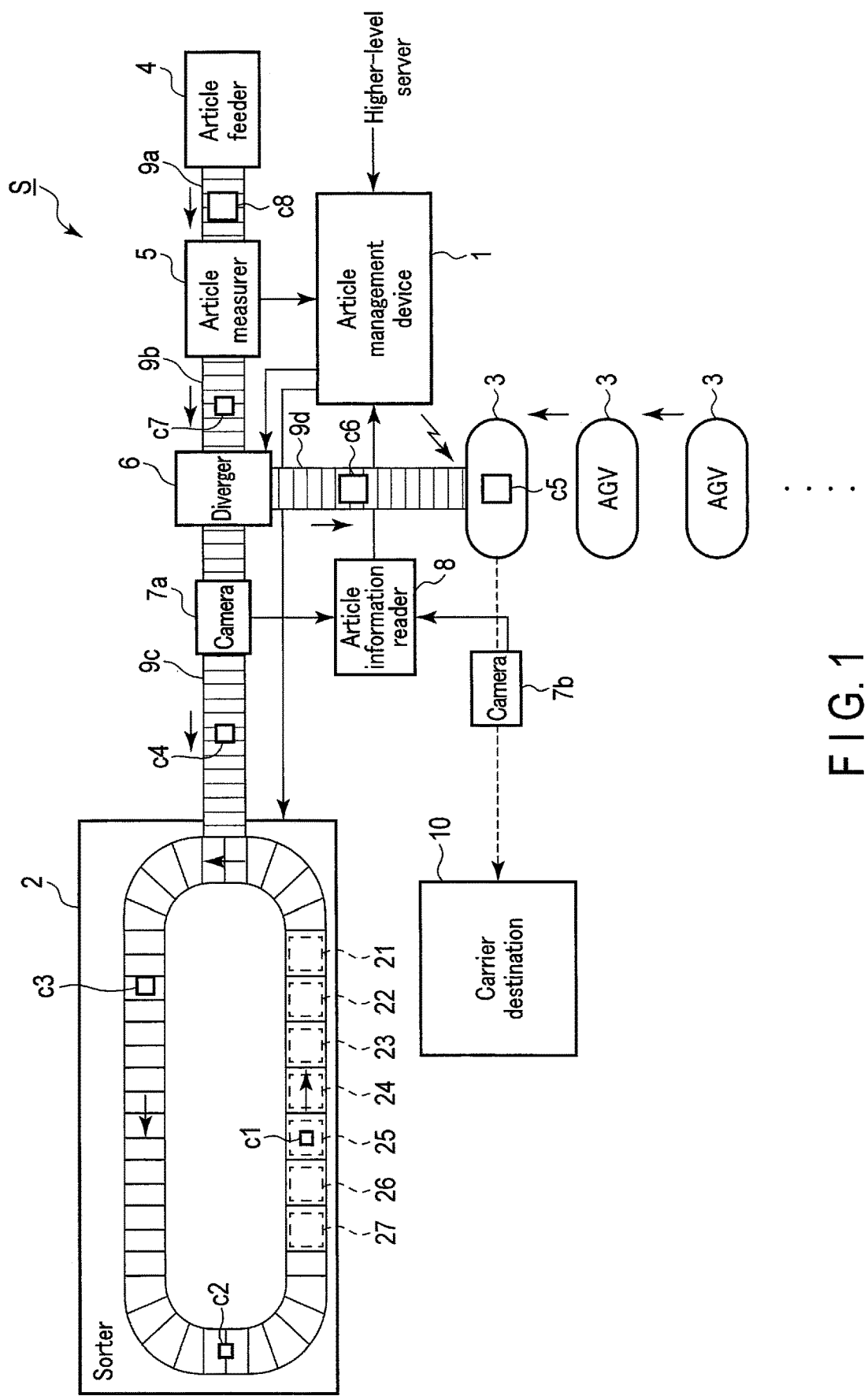
F I G. 1

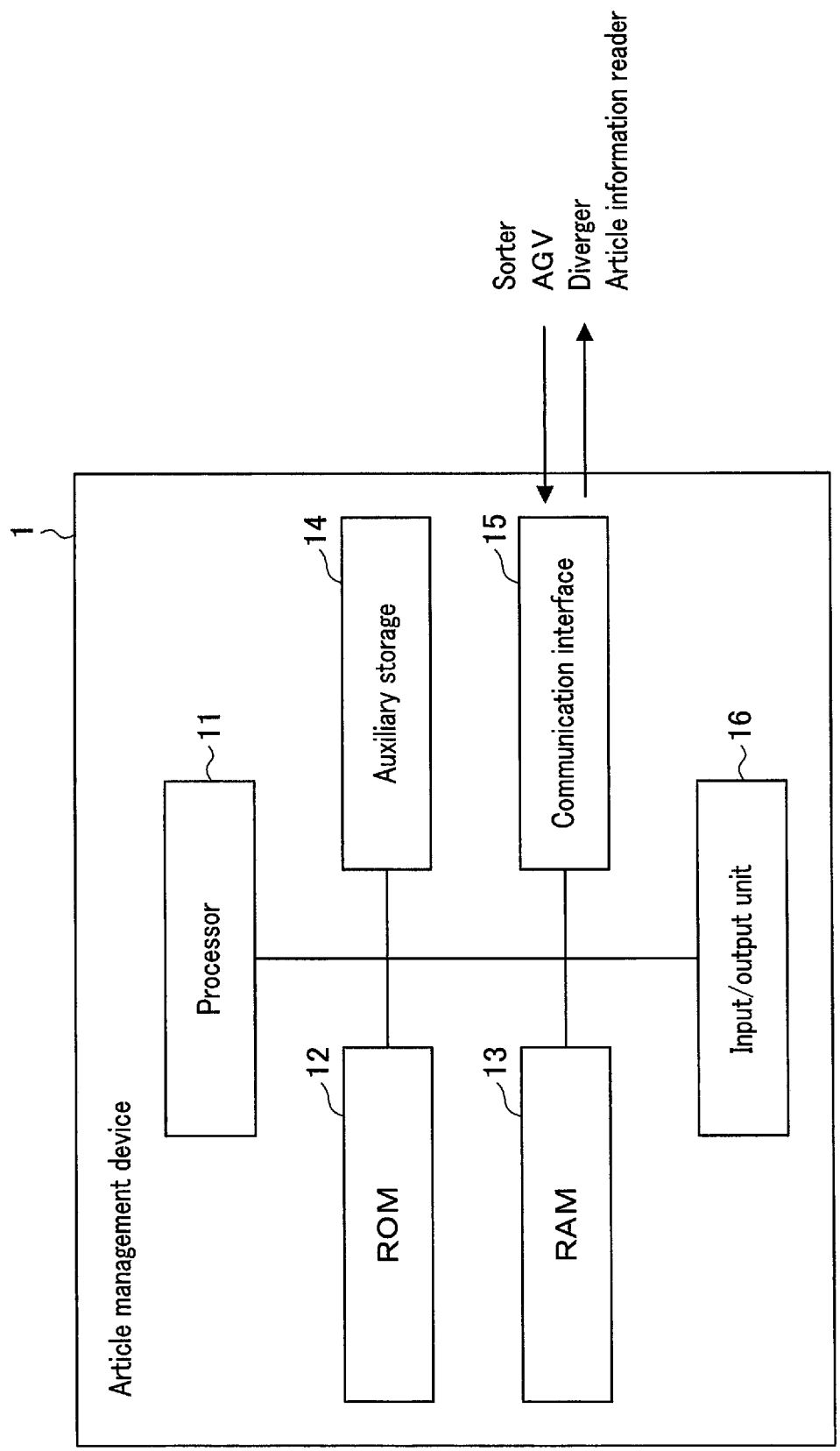
F I G. 2

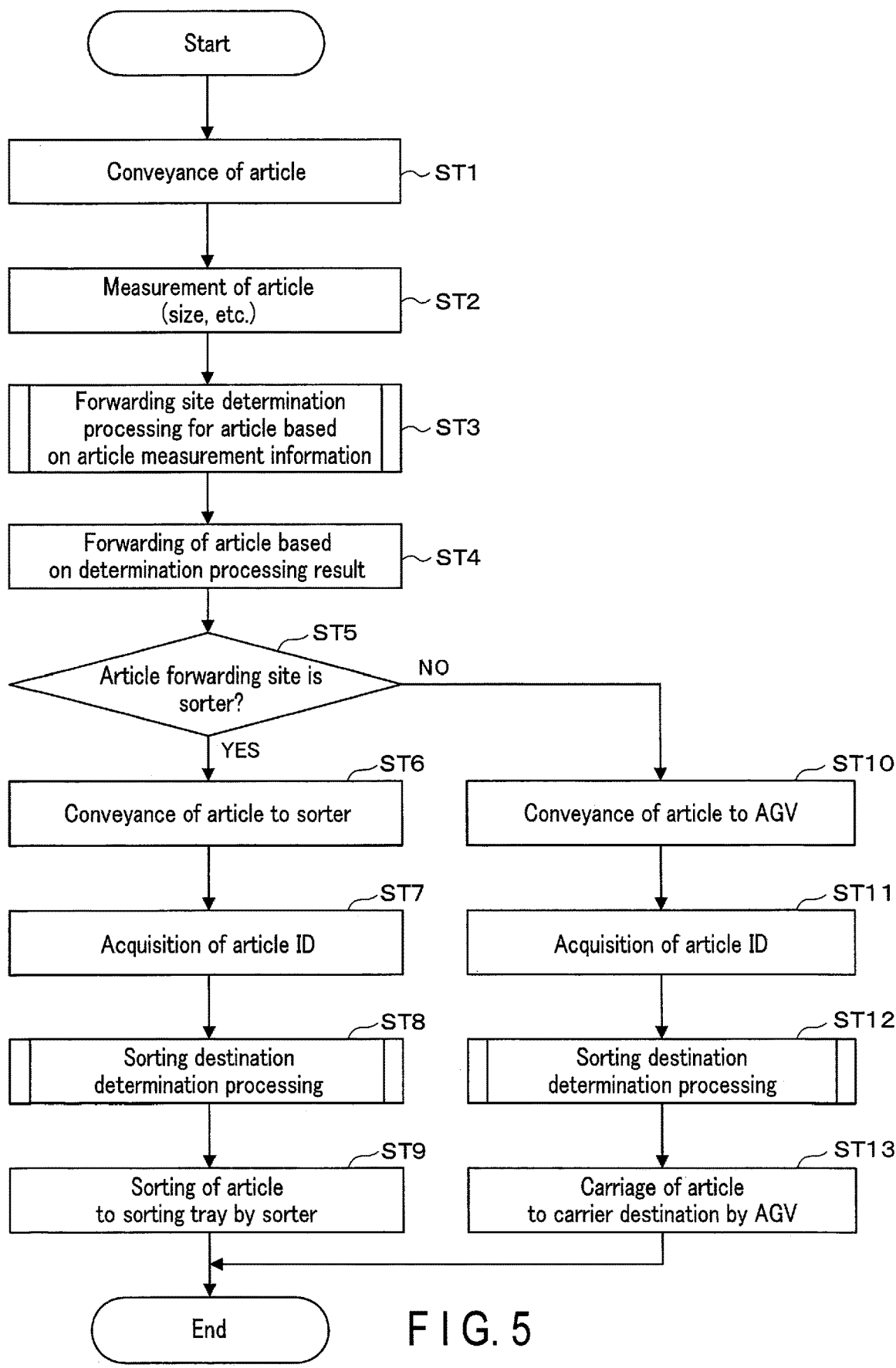
F I G. 5

ARTICLE MANAGEMENT DEVICE, ARTICLE MANAGEMENT SYSTEM, AND COMPUTER-READABLE STORAGE MEDIUM

CROSS-REFERENCE TO RELATED APPLICATIONS

This application is based upon and claims the benefit of priority from Japanese Patent Application No. 2019-025732, filed Feb. 15, 2019, the entire contents of which are incorporated herein by reference.

FIELD

Embodiments described herein relate generally to an article management device, an article management system, and a computer-readable storage medium.

BACKGROUND

A sorting system with a sorter is common means for automated sorting of articles such as packages. There are many types of sorters and a sorter for use is selected according to an area for installation, handling speed, and kinds of articles. Kinds of articles may refer to differences in size, weight, shape, etc.

Still, a sorter that can deal with every kind of articles is yet to be available, and articles out of the sorter's capability are handled by operators' manual sorting. Manual sorting poses a great burden to logistics businesses. Such a burden might be mitigated through, for example, installation of two or more types of sorters, which however would incur upsizing of the entire system and would not promise cost-effectiveness, so is not the best approach. Also, increased labor of operators to pick and route articles to respective sorters, and delayed handling are additional concerns.

It is an ever-present demand in logistics businesses to improve efficiency in article sorting, and technology for realizing efficient handling of a greater variety of articles is sought for.

BRIEF DESCRIPTION OF THE DRAWINGS

General architecture for implementing various features of the embodiments will be described with reference to the drawings. The drawings and the associated descriptions are provided to illustrate the embodiments and not to limit the scope of the invention.

FIG. 1 is a diagram showing one exemplary general configuration of an article management system according to a certain embodiment.

FIG. 2 is a block diagram showing one exemplary general configuration of an article management device according to a certain embodiment.

FIG. 5 is a flowchart showing one exemplary article handling performed by an article management system according to a certain embodiment.

DETAILED DESCRIPTION

Figure 3:
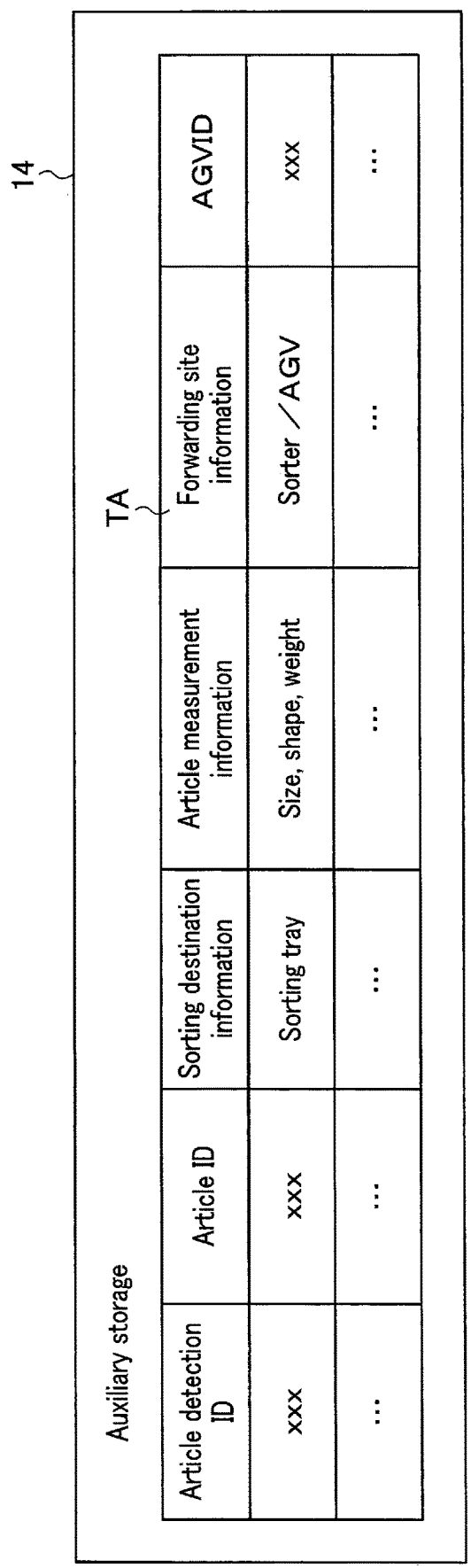
FIG. 3 is a diagram showing one exemplary article management table stored in an auxiliary storage of an article management device according to a certain embodiment.

In general, according to one embodiment, an article management device includes a receiver, a processor, and a transmitter. The receiver is configured to receive article measurement information acquired from measuring an article. The processor is configured to select a first divergence control signal or a second divergence control signal based on the article measurement information, the first divergence control signal being for forwarding the article to a sorter configured to sort the article according to sorting destination information corresponding to the article, the second divergence control signal being for forwarding the article to a carrier configured to carry the article according to a carrier control signal. The transmitter is configured to transmit the first or the second divergence control signal to a diverger configured to forward the article toward the sorter or the carrier.

According to a certain embodiment, an article management device includes a receiver, a processor, and a transmitter.

The receiver is adapted to receive article measurement information acquired from measuring an article. The processor is adapted to select a first divergence control signal or a second divergence control signal based on the article measurement information. The first divergence control signal is for forwarding the article to a sorter adapted to sort the article according to sorting destination information corresponding to the article. The second divergence control signal is for forwarding the article to a carrier adapted to carry the article according to a carrier control signal. The transmitter is adapted to transmit the first or the second divergence control signal to a diverger adapted to forward the article toward the sorter or the carrier.

Now, the embodiments will be described with reference to the drawings.

FIG. 1 is a diagram showing one exemplary general configuration of an article management system according to a certain embodiment.

The article management system is denoted by S, and as shown in FIG. 1, the article management system S includes an article management device 1, a sorter 2, one or more automated guided vehicles (AGV's) 3's, and so on. The article management system S is provided with an article feeder 4, an article measurer 5, a diverger 6, cameras 7a and 7b, an article information reader 8, conveyor belts 9a, 9b, 9c, and 9d, etc.

The article management system S further includes multiple article sensors to detect articles c's (e.g., articles c1 to c8) conveyed by the sorter 2, the conveyor belts 9a, 9b, 9c, and 9d, etc. The article management system S with this configuration monitors detection signals from the article sensors to trace the conveyance (movement) of each article c, and thus can detect or estimate where each article c is located. For example, the article management system S is capable of detecting or estimating an article c having been placed on the AGV 3, as well. The article management system S also assigns article detection identification information (hereinafter, "article detection ID" or "article detection ID's") to respective articles c's (fed one by one from the article feeder 4) as the subjects of detection by the article sensors.

Articles c's handled by the article management system S are packages, etc., of various sizes, shapes, and weights. The articles c's are each preassigned with article identification information (hereinafter, "article ID" or "article ID's"). For example, each article c may be directly marked with the article ID, or a tag or the like marked with the article ID may be attached to each article c. Marking of the article ID's may be implemented by a method of printing visible marks, or a method of printing invisible marks using infrared-absorbing ink, etc. Each article c may instead or optionally be affixed with an electronic tag, wireless tag, or the like that stores the article ID.

The article ID is an information piece constituted by numerals, characters, symbols, a barcode, a two-dimensional code, a QR code (registered trademark), or a combination of two or more thereof, and at least contains unique information. The article ID may contain later-discussed sorting destination information, or an article management table TA stored by the article management device 1 may contain the sorting destination information associated with the article ID. The description of this embodiment will assume the latter.

The article management device 1 may be realized by, for example, a single computer or a combination of multiple computers, and it communicates with other devices using cables or in a wireless manner so that information from other devices is received and stored and control over other devices is implemented by transmitting control signals, etc. to them. Examples of such other devices include the sorter 2, the AGV's 3's, and the diverger 6. Operations, etc. of the article management device 1 will be described in more detail later, with reference to FIG. 2.

The sorter 2 is a sorting device adapted to sort articles c's to respective sorting destinations based on their corresponding sorting information. More specifically, the sorter 2 sorts an article c to, according to one example, a targeted or intended sorting tray among sorting trays 21 to 27, based on the sorting destination information associated with the article ID. The sorter 2 receives the article c having been conveyed by the conveyor belt 9c, and sorts it to intended one of the sorting trays 21 to 27 based on the sorting destination information from the article management device 1. Operations, etc. of the sorter 2 will be described in more detail later.

Each AGV 3 may be an unmanned carrier vehicle adapted to carry articles c's. The AGV 3 receives the article c having been conveyed by the conveyor belt 9d, and delivers it to a carrier destination 10 according to a carrier control signal from the article management device 1. For example, the AGV 3 carries the received article c to the carrier destination 10 based on the carrier control signal containing location information corresponding to the carrier destination 10. The AGV 3 may instead or further be adapted to carry the received article c to a location corresponding to intended one of the sorting trays 21 to 27 based on the carrier control signal containing location information corresponding to this intended tray.

The article feeder 4 receives articles c's from an operator or articles c's passed on by a conveyor belt, etc., and the conveyor belt 9a conveys the articles c's received at the article feeder 4 to the article measurer 5.

The article measurer 5 measures at least one of the size, shape, and weight of the conveyed article c, and outputs article measurement information acquired from the measurement to the article management device 1. For example, the article measurer 5 may utilize multiple sensors to obtain multi-directional sensing results for the article c so that the size (measurements in the directions of X-axis, Y-axis, and Z-axis) and shape of the article c are measured based on the combination of these sensing results, and may utilize a scale to measure the weight of the article c. Examples that can be employed as such sensors include a laser distance sensor adapted to measure the distance from the light source to the article c. The article measurer 5 may also employ a camera or the like as appropriate to take images of the article c from multiple directions and subjects the acquired images to analysis processing so that the size and shape of the article c are measured. The conveyor belt 9b conveys the article c after the measurement at the article measurer 5 to the diverger 6.

The diverger 6 forwards articles c's toward the sorter 2 or the AGV's 3's based on a divergence control signal S11 (first divergence control signal) or a divergence control signal S12 (second divergence control signal), transmitted from the article management device 1. For example, the diverger 6 places the article c having been conveyed by the conveyor belt 9b onto the conveyor belt 9c based on the divergence control signal S11 transmitted from the article management device 1, and the conveyor belt 9c conveys the article c to the sorter 2 so that the article c is sent to the sorter 2. Also, the diverger 6 places the article c having been conveyed by the conveyor belt 9b onto the conveyor belt 9d based on the divergence control signal S12 transmitted from the article management device 1, and the conveyor belt 9d conveys the article c to the AGV's 3's so that the article c is set in the loading position of the applicable AGV 3. Note that the diverger 6 may include a robot arm configuration, etc. to pick up articles c's and forward them toward the sorter 2 or the AGV's 3's.

The camera 7a is arranged at a position where it faces the conveyor belt 9c, and images the articles c's conveyed by the conveyor belt 9c. For example, multiple cameras 7a's may be arranged so that the article c being conveyed by the conveyor belt 9c is imaged at various angles. The camera 7a outputs image data acquired from the imaging to the article information reader 8. Note that one or more cameras 7a's may be arranged at any positions including, for example, a position to face the conveyor belt 9a or 9b.

The AGV 3 loads the article c having been conveyed by the conveyor belt 9d, and carries it to the carrier destination 10 or a location corresponding to intended one of the sorting trays 21 to 27, based on the carrier control signal transmitted from the article management device 1.

The camera 7b is arranged at a position where it faces the carriage path of the AGV's 3's, and images the articles c's carried by the AGV's 3's. For example, multiple cameras 7b's may be arranged so that the article c being carried by the AGV 3 is imaged at various angles. The camera 7b outputs image data acquired from the imaging to the article information reader 8. Note that one or more cameras 7b's may be arranged at any positions including, for example, a position to face the conveyor belt 9d.

The article information reader 8 receives the image data output from the cameras 7a and 7b, reads the article ID contained in the image data, and transmits the article ID to the article management device 1. If the article ID is constituted by a QR code, the article information reader 8 functions as a QR code reader. If the article ID is in the form of information stored in a wireless tag, the article information reader 8 functions as a wireless tag reader adapted to read the article ID from the wireless tag in a wireless manner.

FIG. 2 is a block diagram showing one exemplary general configuration of the article management device 1 according to a certain embodiment. As shown in FIG. 2, the article management device 1 includes a processor 11, a read-only memory (ROM) 12, a random-access memory (RAM) 13, an auxiliary storage 14, a communication interface 15, and an input/output unit 16.

The processor 11 serves as a central part of the computer and performs calculation processing and control processing required for the handling of articles c's. The handling of articles c's includes conveyance, carriage, forwarding, and sorting operations, etc. for the articles c's. In order to realize various functions of the article management device 1, the processor 11 executes control based on one or more programs of system software, application software, or firmware stored in the ROM 12 or the auxiliary storage 14. The processor 11 may be, for example, a central processing unit (CPU), a micro processing unit (MPU), or a digital signal processor (DSP). The processor 11 may also be a combination of two or more of a CPU, an MPU, and a DSP. The processor 11 assigns, based on the detection signals from the multiple article sensors, the article detection ID to each article c as the subject of detection, and detects or estimates where each article c is located by tracing its conveyance (movement).

The ROM 12 serves as a main storage unit of the computer that employs the processor 11 as a central part. The ROM 12 may be a nonvolatile memory used exclusively for data read. The ROM 12 may be a non-transitory computer-readable storage medium storing the aforementioned one or more programs. Also, the ROM 12 stores data for use by the processor 11 to perform various processing, as well as a variety of setting values, etc.

The RAM 13 serves as a main storage unit of the computer that employs the processor 11 as a central part. The RAM 13 is a memory for data read and data write. The RAM 13 may be used as a so-called work area or the like, for storage of data used on a tentative basis by the processor 11 to perform various processing.

The auxiliary storage 14 serves as an auxiliary storage unit of the computer that employs the processor 11 as a central part. The auxiliary storage 14 may be, for example, an electric erasable programmable read-only memory (EEPROM) (registered trademark), a hard disk drive (HDD), a solid state drive (SSD), or the like. The auxiliary storage 14 may also function as a non-transitory computer-readable storage medium storing the aforementioned one or more programs. The auxiliary storage 14 stores data for use by the processor 11 to perform various processing, data generated from the processing by the processor 11, a variety of setting values, and so on. Note that the article management device 1 may include an interface adapted to receive insertion of a storage medium such as a memory card, a universal serial bus (USB), etc., in place of or in addition to the auxiliary storage 14.

The program or programs stored in the ROM 12 or the auxiliary storage 14 include a program for handling articles c's. In an exemplary instance, the article management device 1 is provided to an administrator or the like of the same, in the state that such a program has already been stored in the ROM 12 or the auxiliary storage 14. In other instances, the article management device 1 may be provided to an administrator, etc., in the state that the program is not stored in the ROM 12 or the auxiliary storage 14. The program for handling articles c's may be separately given to the administrator, etc., and subsequently written to the auxiliary storage 14 by the administrator or a serviceman, etc. Giving the program here may be realized through, for example, handover of a removable, non-transitory computer-readable storage medium such as a magnetic disk, an optical disk, or a semiconductor memory storing the program, or through download of the program via a network.

The communication interface 15 is an interface adapted to communicate with other devices via a network, etc., using cables or in a wireless manner. The communication interface 15 receives various information from other devices, and transmits various information to other devices. For example, the communication interface 15 functions as a receiver to receive, from a higher-level server for the article management system S, the article ID of the respective article c and the sorting destination information associated with this article ID before the article management system S starts article handling operations. Also, the communication interface 15 receives the detection signals from the article sensors, the article measurement information from the article measurer 5, and the article Id's from the article information reader 8. The communication interface 15 further functions as a transmitter to transmit the sorting destination information to the sorter 2, the carrier control signals to the AGV 3, and the divergence control signals S11 and S12 to the diverger 6.

The input/output unit 16 includes a keyboard, numerical keypads, a mouse, a touch-panel display, and so on. Operator's instruction inputs are received through the keyboard, numerical keypads, mouse, touch-panel display, etc., and sent to the processor 11. The touch-panel display is adapted to present various information to the operator.

FIG. 3 is a diagram showing one exemplary article management table TA stored in the auxiliary storage 14 of the article management device 1 according to a certain embodiment.

As shown in FIG. 3, the auxiliary storage 14 functions as a storage unit to store the article management table TA, and this article management table TA stores the article ID, sorting destination information, article measurement information, forwarding site information, and AGV identification information (hereinafter, "AGVID" or "AGVID's") in association with the respective article detection ID assigned to each of the every detected article c, namely, articles c1 to c8 here. Note that if the article ID is available from all the articles c's handled by the article management system S, the article detection ID is not a requisite. In such cases, the article management table TA stores the sorting destination information, article measurement information, forwarding site information, and AGVID in association with the respective article ID acquired. The processor 11 then detects or estimates where each of the articles c1 to c8 is located, by tracing the movement of the articles c1 to c8 corresponding to their respective article ID's.

Next, the sorter 2 will be described. The sorter 2 may be, for example, a cross belt sorter, a sliding shoe sorter, or a bomb-bay sorter. The sorter 2, when it is a cross belt sorter, conveys an article c using a conveyance tray of a belt conveyor component, and discharges the article c from the position on the conveyance tray to an intended sorting tray by utilizing the rotation of the conveyor belt. The sorter 2, when it is a sliding shoe sorter, conveys an article c using a conveyance tray, and upon the conveyance tray reaching the location of an intended sorting tray, inclines the conveyance tray so that the article c slides to the intended sorting tray. The sorter 2, when it is a bomb-bay sorter, conveys an article c using a conveyance tray with an operable bottom, and upon the conveyance tray reaching the location above an intended sorting tray or a chute that leads to an intended sorting tray, opens the bottom of the conveyance tray so that the article c drops to the intended sorting tray or the chute.

The description of this embodiment will assume the sorter 2 to be a bomb-bay sorter. For example, the sorter 2 includes a circular conveyance path with multiple conveyance trays. These conveyance trays rotate along the conveyance path. Articles c's having been conveyed by the conveyor belt 9c are placed on the respective conveyance trays on the conveyance path of the sorter 2, one conveyance tray loading one article c to rotate along the conveyance path. The sorter 2 opens the bottom of the respective conveyance tray upon it reaching the location above the intended one of the sorting trays 21 to 27, and allows the article c to drop to the intended sorting tray.

Figure 4:
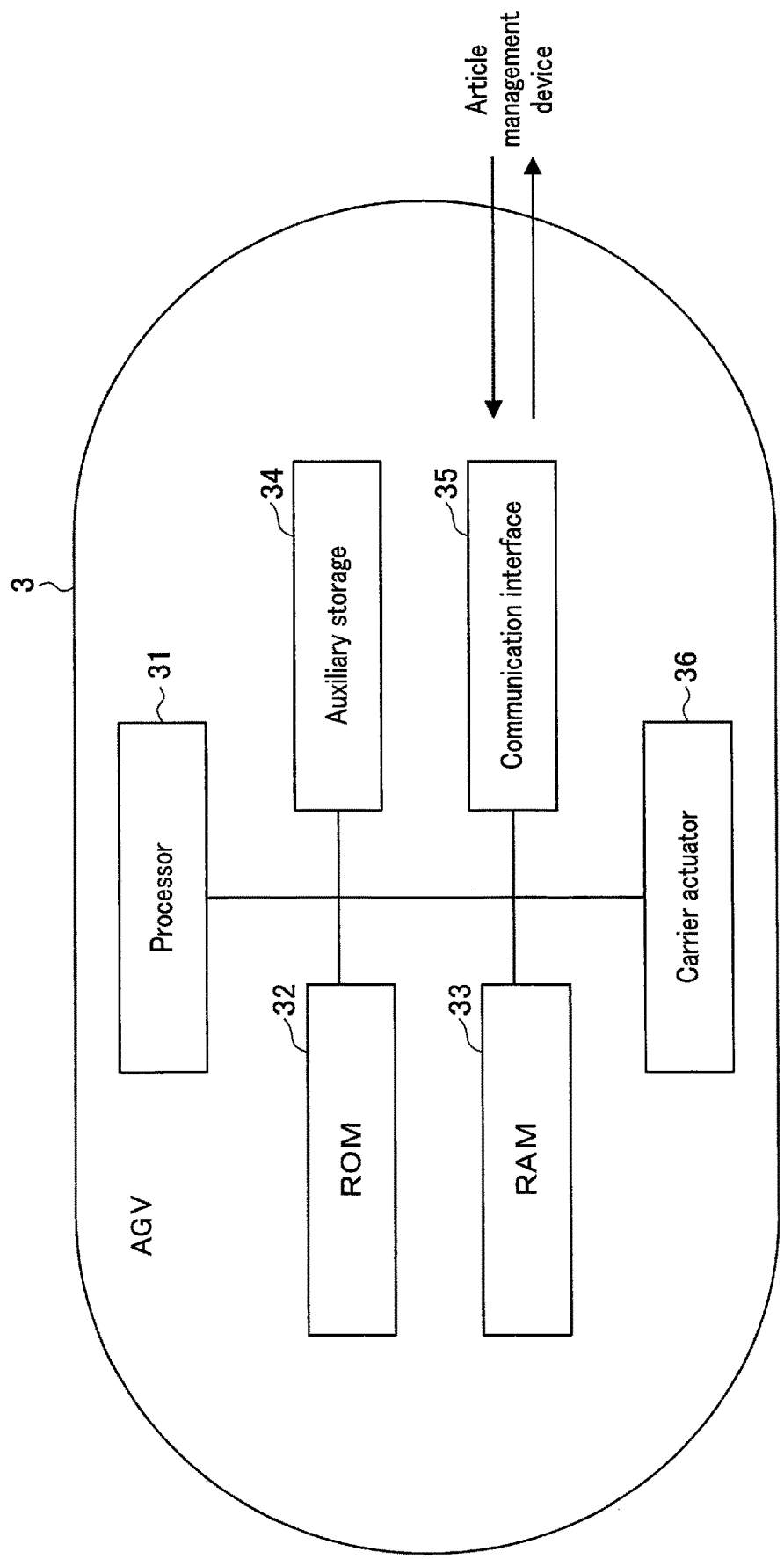
FIG. 4 is a block diagram showing one exemplary general configuration of an automated guided vehicle (AGV) according to a certain embodiment.

FIG. 4 is a block diagram showing one exemplary general configuration of the AGV 3 according to a certain embodiment.

Each AGV 3 may be an automated, wheeled robot adapted to carry one or more articles c's loaded thereon to a destination point, according to the carrier control signal from the article management device 1. For example, the AGV 3 carries an article c to the carrier destination 10 or a location corresponding to intended one of the sorting trays 21 to 27 based on map data, destination point data, and current location data contained in the carrier control signal. The AGV 3 runs by itself to the destination point while detecting the distance and direction of its traveling. For example, the AGV 3 may be adapted to automatically run to the destination point by following a magnetic tape or a two-dimensional barcode arranged on the traveling course. The AGV 3 may be additionally equipped with a laser detector, a camera, or the like for detecting obstacles (including other AGV's 3's) so that during the travel it can avoid obstacles detected by the laser detector or identified through the analysis of images acquired by the camera.

As shown in FIG. 4, each AGV 3 includes a processor 31, a ROM 32, a RAM 33, an auxiliary storage 34, a communication interface 35, and a carrier actuator 36.

The processor 31 serves as a central part of a computer and performs calculation processing and control processing required for the operation of carrying articles c's. In order to realize various functions of the AGV 3, the processor 31 executes control based on one or more programs of system software, application software, or firmware stored in the ROM 32 or the auxiliary storage 34. The processor 11 may be, for example, a CPU, an MPU, or a DSP. The processor 11 may also be a combination of two or more of these. In one exemplary case, the article management device 1 transmits the carrier control signal for the AGV 3 to move to a destination point, and the processor 31 outputs an actuation signal according to the map data, the destination point data, and the current location data contained in this carrier control signal.

The ROM 32 serves as a main storage unit of the computer that employs the processor 31 as a central part. The ROM 32 may be a nonvolatile memory used exclusively for data read. The ROM 32 may be a non-transitory computer-readable storage medium storing the aforementioned one or more programs. Also, the ROM 32 stores data for use by the processor 31 to perform various processing, as well as a variety of setting values, etc.

The RAM 33 serves as a main storage unit of the computer that employs the processor 31 as a central part. The RAM 33 is a memory for data read and data write. The RAM 33 may be used as a so-called work area or the like, for storage of data used on a tentative basis by the processor 31 to perform various processing.

The auxiliary storage 34 serves as an auxiliary storage unit of the computer that employs the processor 31 as a central part. The auxiliary storage 14 may be an EEPROM, an HDD, an SSD, or the like. The auxiliary storage 34 may also function as a non-transitory computer-readable storage medium storing the aforementioned one or more programs. The auxiliary storage 34 stores data for use by the processor 31 to perform various processing, data generated from the processing by the processor 31, a variety of setting values, and so on.

The communication interface 35 is an interface adapted to communicate with other devices via a network, etc. in a wireless manner. The communication interface 35 receives various information from other devices, and transmits various information to other devices. For example, the communication interface 15 functions as a receiver to receive the carrier control signal from the article management device 1.

The carrier actuator 36 includes a motor, one or more wheels revolved by the motor, a steering mechanism for switching the traveling directions, and so on. The carrier actuator 36 rotates or stops the motor based on the actuation signal output from the processor 31 and controls the steering mechanism, so that the AGV 3 is moved to the destination point.

FIG. 5 is a flowchart showing one exemplary article handling performed by the article management system S according to a certain embodiment. Here, for example, the higher-level server sends the article ID and the sorting destination information for each handling subject, i.e., article c, to the article management device 1 in advance, and the article management table TA registers these article ID and sorting destination information in advance.

Articles c's are fed from the article feeder 4 of the article management system S, and the article management system S starts conveyance of the articles c's using the conveyor belts 9a, 9b, 9c, and 9d, etc. (ST1). The multiple article sensors in the article management system S detect the sequentially conveyed articles c's and transmit the corresponding detection signals to the article management device 1. The communication interface 15 of the article management device 1 receives the detection signals, and the processor 11 assigns the article detection ID's to the respective articles c's based on the detection signals. In other words, the processor 11 registers the article detection ID's in association with the respective, sequentially detected articles c's in the article management table TA. At this stage, the article ID's have not been read from the conveyed articles c's yet, so the article ID's already and previously registered in the article management table TA cannot be associable with the article detection ID's.

The conveyor belt 9a conveys the articles c's to the article measurer 5. The article measurer 5 measures at least one of the size, shape, and weight of each conveyed article c (ST2), and transmits the article measurement information acquired from the measurement to the article management device 1. The communication interface 15 receives the article measurement information, and the processor 11 registers the article measurement information in association with the corresponding article detection ID in the article management table TA.

The processor 11 also performs processing for determining to which site each article c should be forwarded (determining the forwarding site) based on the article measurement information (ST3). Here, based on the article measurement information, the processor 11 selects and outputs the divergence control signal S11 for forwarding the article c to the sorter 2 or the divergence control signal S12 for forwarding the article c to the AGV 3. In response to the processor 11 having selected and output the divergence control signal S11 or S12, the communication interface 15 transmits the output divergence control signal S11 or S12 to the diverger 6. The processing for determining the forwarding site will be described in more detail later.

When it is determined in the forwarding site determination processing that the article c should be forwarded to the sorter 2, the processor 11 registers the forwarding site information indicative of the sorter 2 in association with the article detection ID of the article c in the article management table TA. On the other hand, when it is determined in the forwarding site determination processing that the article c should be forwarded to the AGV 3, the processor 11 registers the forwarding site information indicative of the AGV 3 in association with the article detection ID of the article c in the article management table TA.

The diverger 6 forwards each article c toward the sorter 2 or the AGV 3 based on the respective result of the forwarding site determination processing (ST4). That is, according to the result of the forwarding site determination processing, the diverger 6 forwards the article c toward the sorter 2 in response to receiving the divergence control signal S11, and forwards the article c toward the AGV 3 in response to receiving the divergence control signal S12.

When the diverger 6 has forwarded the article c toward the sorter 2 (ST5, YES), the article c is conveyed to the sorter 2 by the conveyor belt 9c (ST6). The camera 7a images each article c conveyed by the conveyor belt 9c, and outputs the image data acquired from the imaging to the article information reader 8. The article information reader 8 receives the image data output from the camera 7a, reads the article ID from the image data (ST7), and transmits the article ID to the article management device 1.

The communication interface 15 of the article management device 1 receives the article ID from the article information reader 8, and the processor 11 associates the received article ID with the previously registered article ID in the article management table TA. In the article management table TA, therefore, the article ID, the sorting destination information, the article measurement information, and the forwarding site information are now registered in association with the article detection ID for the corresponding article c.

The processor 11 performs processing for determining the sorting destination (ST8) to select and output the sorting destination information associated with the article detection ID, and the communication interface 15 transmits the sorting destination information to the sorter 2. The sorter 2 receives the sorting destination information, and sorts the corresponding article c to intended one of the sorting trays 21 to 27 based on the sorting destination information (ST9).

When, on the other hand, the diverger 6 has forwarded the article c toward the AGV 3 (ST5, NO), the article c is conveyed to the AGV 3 by the conveyor belt 9d (ST10). The camera 7b here images each article c conveyed by the conveyor belt 9d, and outputs the image data acquired from the imaging to the article information reader 8. The article information reader 8 receives the image data output from the camera 7b, reads the article ID from the image data (ST11), and transmits the article ID to the article management device 1.

The communication interface 15 of the article management device 1 receives the article ID from the article information reader 8, and the processor 11 associates the received article ID with the previously registered article ID in the article management table TA. In the article management table TA, therefore, the article ID, the sorting destination information, the article measurement information, and the forwarding site information are now registered in association with the article detection ID for the corresponding article c.

The processor 11 performs the sorting destination determination processing (ST12) to select and output the destination point data corresponding to the sorting destination information associated with the article ID. The communication interface 15 communicates with one of the multiple AGV's 3's that is on standby for the article carriage, so that the communication interface 15 receives the AGVID from this AGV 3 and transmits the carrier control signal containing the map data, the destination point data, the current location data, etc. to this AGV 3.

The AGV 3 receives the carrier control signal, and carries the article c loaded thereon to the destination based on the map data, the destination point data, and the current location data contained in the carrier control signal (ST13). For example, the destination point data indicates the carrier destination 10. The destination point data can instead indicate the location corresponding to intended one of the sorting trays 21 to 27.

Figure 6:
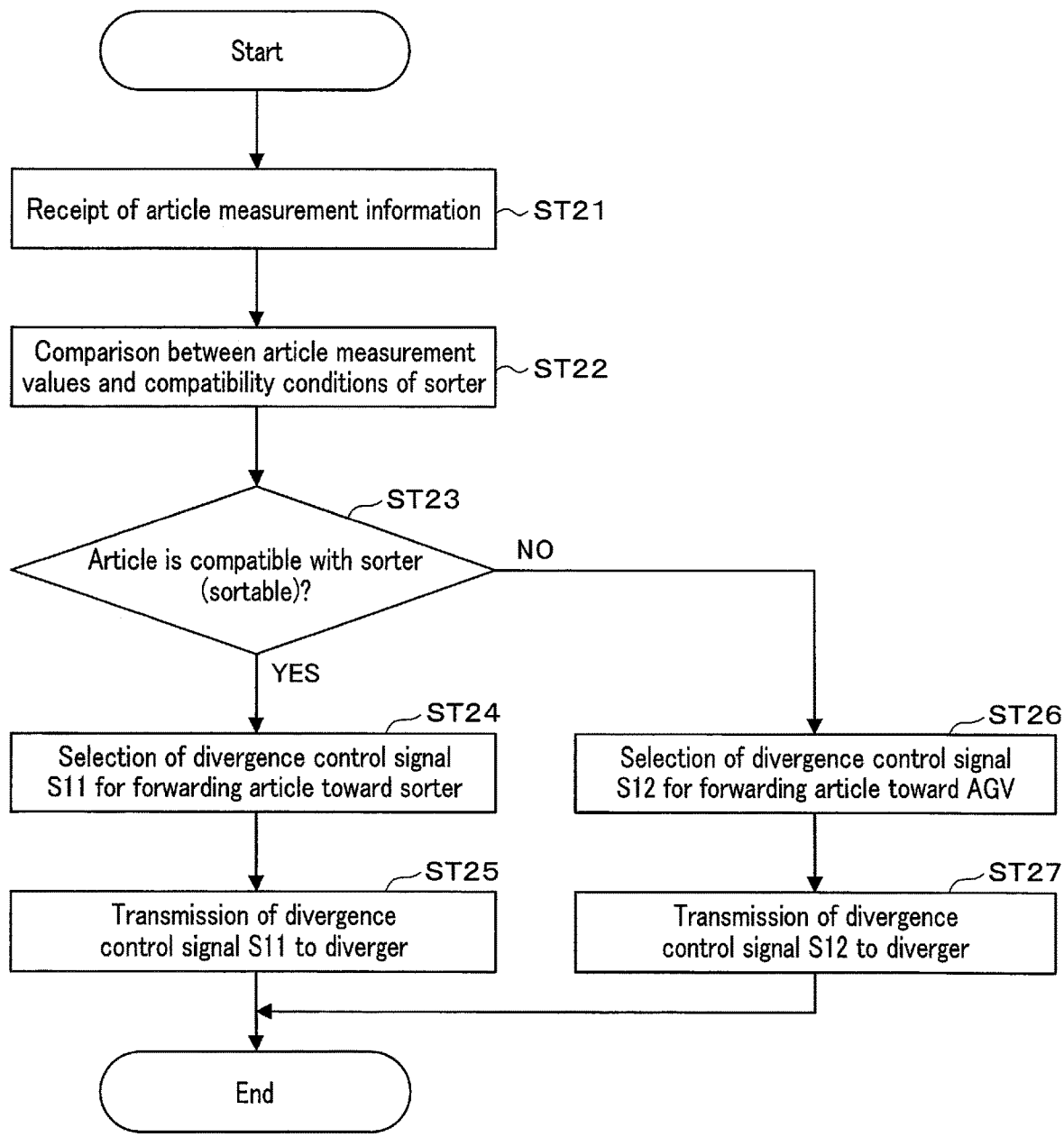
FIG. 6 is a flowchart showing one exemplary processing for determining an article forwarding site, performed by an article management system according to a certain embodiment.

FIG. 6 is a flowchart showing one exemplary processing for determining the article forwarding site (i.e., ST3 in FIG. 5), performed by the article management system S according to a certain embodiment.

As shown in FIG. 6, the processor 11 receives the article measurement information transmitted from the article measurer 5 (ST21), makes comparison between the article measurement values contained in the article measurement information and the conditions registered in the auxiliary storage 34 for compatibility with the sorter (ST22), and determines whether or not the corresponding article c is compatible with the specification of the sorter 2 (ST23). Examples of such compatibility conditions include threshold criteria for determining whether the article c can be sorted by the sorter 2 or the article c is not a suitable object for the sorting by the sorter 2. The processor 11 compares the article measurement values with the threshold criteria, and determines based on the comparison result that the article c can be sorted by the sorter 2 or that the article c is not a suitable object for the sorting by the sorter 2.

For example, the compatibility conditions of the sorter 2 may adopt an upper limit or a lower limit for the sum of measurements of the article c in the X-axis, Y-axis, and Z-axis directions (hereinafter, "three-side size"). The processor 11 compares the three-side size extracted from the article measurement values with the upper limit or the lower limit, and if the three-side size is found above the upper limit or below the lower limit, the processor 11 determines that the article c is not compatible with the sorter 2, i.e., the article c is not a suitable object for the sorting by the sorter 2. If the three-side size is found equal to or below the upper limit, or found equal to or above the lower limit, the processor 11 determines that the article c is compatible with the sorter 2, i.e., the article c can be sorted by the sorter 2. In another instance, the compatibility conditions may adopt both the upper limit and the lower limit for the three-side size. In this instance, the processor 11 may be adapted to determine, if the three-side size is above the upper limit or below the lower limit, that the article c is not compatible with the sorter 2 (the article c is not a suitable object for the sorting by the sorter 2), and to determine, if the three-side size is equal to or below the upper limit and also equal to or above the lower limit, that the article c is compatible with the sorter 2 (the article c can be sorted by the sorter 2). Moreover, the compatibility conditions may instead or additionally adopt at least one of an upper weight limit and a lower weight limit, as well as a condition for the shape. For example, the compatibility conditions may include shape or geometry parameters for determining that shapes such as easily-rolling spheres and cylinders are not the suitable objects for the sorting by the sorter 2.

When it is determined based on the article measurement information that the article c is compatible with the specification of the sorter 2, and is therefore sortable (ST23, YES), the processor 11 selects and outputs the divergence control signal S11 for forwarding the article c to the sorter 2 (ST24). The communication interface 15 transmits the divergence control signal S11 to the diverger (ST25). The diverger 6 receives the divergence control signal S11, and based thereon, forwards the article c toward the sorter 2.

On the other hand, when it is determined based on the article measurement information that the article c is not compatible with the specification of the sorter 2, and is therefore unsuitable for sorting (ST23, NO), the processor 11 selects and outputs the divergence control signal S12 for forwarding the article c to the AGV 3 (ST26). The communication interface 15 transmits the divergence control signal S12 to the diverger 6 (ST27). The diverger 6 receives the divergence control signal S12, and based thereon, forwards the article c toward the AGV 3.

Figure 7:
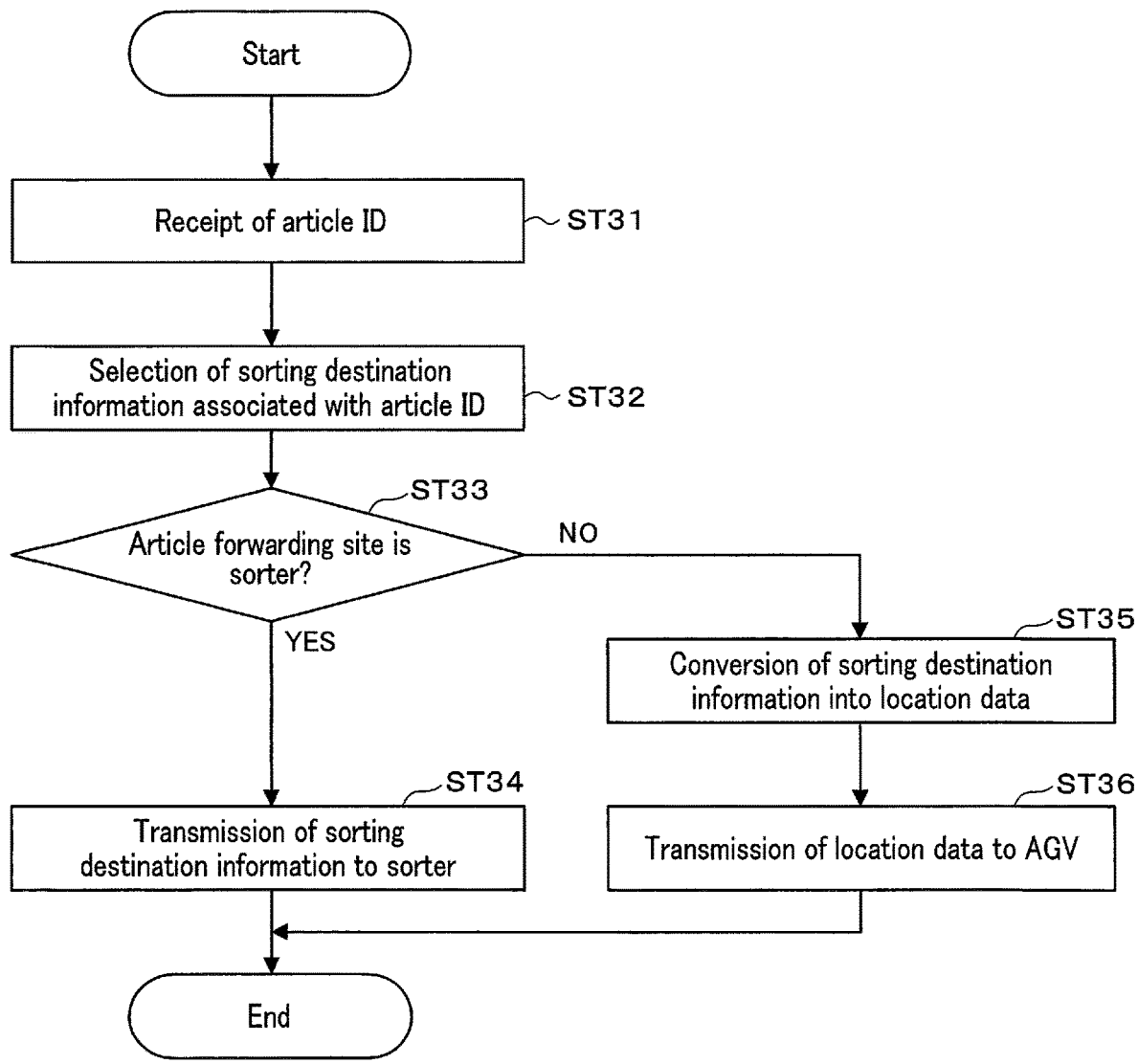
FIG. 7 is flowchart showing one exemplary processing for determining a sorting destination, performed by an article management system according to a certain embodiment.

FIG. 7 is flowchart showing one exemplary processing for determining the sorting destination (i.e., ST8 and ST12 in FIG. 5), performed by the article management system S according to a certain embodiment.

As shown in FIG. 7, the processor 11 receives the article ID transmitted from the article information reader (ST31), and selects the sorting destination information associated with this article ID in the article management table TA (ST32).

When the forwarding site based on the "sortable" determination (hereinafter, "determination d1") in ST3 of the forwarding site determination processing for the corresponding article c is the sorter 2 (ST33, YES), the processor 11 selects the sorting destination information for transmission to the sorter 2. The processor 11 also gives an instruction to transmit the sorting destination information to the sorter 2. Following this instruction, the communication interface 15 transmits the sorting destination information to the sorter 2 (ST34). The sorter 2 sorts the article c to intended one of the sorting trays 21 to 27 based on the sorting destination information.

On the other hand, when the forwarding site based on the "unsuitable for sorting" determination (hereinafter, "determination d2") in ST3 of the forwarding site determination processing for the corresponding article c is the AGV 3 (ST33, NO), the processor 11 selects the carrier control signal for transmission to the AGV 3. Further, the processor 11 converts the sorting destination information into the destination point data (ST35). The processor 11 gives an instruction to transmit the carrier control signal containing the map data, this destination point data, the current location data, etc. to the AGV 3. Following this instruction, the communication interface 15 transmits the carrier control signal containing the map data, the destination point data, the current location data, etc. to the AGV 3 (ST36). Here, for example, the processor 11 may refer to the detection signals from the multiple article sensors to detect or estimate the article c having been loaded on one AGV 3, and control the transmission of the carrier control signal so that the carrier control signal is provided to the AGV 3 according to the detection or estimation timing. In this case, the AGV 3, upon receipt of the carrier control signal, is allowed to directly proceed to its carriage operation based on the carrier control signal. Alternatively or additionally, each AGV 3 may also include an article sensor so that the communication interface 15 transmits the carrier control signal at any desired timing and the AGV 3 starts the carriage operation based on the carrier control signal after detecting the own loading of the article c by its article sensor.

For example, the destination point data is location data corresponding to the carrier destination 10. The destination point data can instead be location data corresponding to intended one of the sorting trays 21 to 27. According to one exemplary configuration, the auxiliary storage 14 stores, as the initial setting of the article management system S, the location data corresponding to the carrier destination 10 or the location data corresponding to respective one of the sorting trays 21 to 27 in accordance with the instructions from the higher-level server or the operator. In this case, when the location data corresponding to the carrier destination 10 is in the storage, the processor 11 converts the sorting destination information into the location data corresponding to the carrier destination 10. When the location data corresponding to respective one of the sorting trays 21 to 27 is in the storage, and the sorting destination information is indicative of the sorting tray 21, the processor 11 converts the sorting destination information into the location data corresponding to the sorting tray 21.

The embodiments having been described can offer an article management device, an article management system, and a program that each realize efficient handling of a great variety of articles even with limited sorter facilities. The embodiments can also offer a non-transitory computer-readable medium storing a program that causes a computer to perform efficient handling of a great variety of articles even with limited sorter facilities.

According to one example, the article management device 1 selects the divergence control signal S11 or S12 based on the article measurement information, and transmits the selected divergence control signal S11 or S12 to the diverger 6. The diverger 6 then forwards the articles c's that can be handled by the sorter 2 of the article management system S (articles c's with the determination d1) directly toward the sorter 2. Also, the diverger 6 forwards the articles c's that are not suitable for the handling of the sorter 2 (articles c's with the determination d2) toward the AGV's 3's. Thus, a wide variety of articles can be handled efficiently with limited sorter facilities.

As the limited sorter facilities, the sorter 2 installed may be one, or more than one. For example, the article management system S may include two sorters 2's, but even the use of two sorters 2's would not allow for the practical handling of all kinds of articles. According to the embodiments, the articles c's that cannot be suitably handled by these sorters 2's (articles c's with the determination d2) are carried by the AGV's 3's to the intended destinations, and therefore, all the articles c's can be efficiently handled without needing the manual work of operators, etc.

Moreover, it is possible according to the embodiments that the article management device 1 transmits the carrier control signals to the AGV's 3's to cause each AGV 3 to carry an article c to any desired destination point. For example, the article management device 1 transmits the carrier control signal containing the destination point data corresponding to the carrier destination 10, so that it can cause the AGV 3 to carry an article c to the location corresponding to the carrier destination 10. Also, the article management device 1 detects the sorting tray (one of the sorting trays 21 to 27) corresponding to the sorting destination information, and transmits the carrier control signal containing the destination point data corresponding to this detected sorting tray, so that it can cause the AGV 3 to carry an article c to the corresponding location. That is, the embodiments enable delivery of articles c's to locations corresponding to the intended sorting trays, without routing them through the sorter 2.

Also, according to one application example of the article management device 1, only establishing a network connection among the article management device 1, the sorter 2, the AGV's 3's, and the discretionarily-configured diverger 6 can form the article management system S. The embodiments do not pose a particular limitation on the sorter 2, the AGV's 3's, and the diverger 6.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and the spirit of the inventions.

The invention claimed is:

1. An article management device comprising:
   a receiver configured to receive article measurement information acquired from measuring an article;
   a processor configured to select a first divergence control signal or a second divergence control signal based on the article measurement information, the first divergence control signal being for forwarding the article to a sorter configured to sort the article according to sorting destination information corresponding to the article, the second divergence control signal being for forwarding the article to a carrier configured to carry the article according to a carrier control signal; and
   a transmitter configured to transmit the first or the second divergence control signal to a diverger configured to forward the article toward the sorter or the carrier,
   wherein
   the receiver is configured to receive article identification information for identifying the article,
   the processor is configured to select the sorting destination information associated with the article identification information in response to determining that the article is sortable by the sorter,
   the transmitter is configured to transmit the sorting destination information to the sorter,
   the processor is configured to select the carrier control signal for carrying the article to a carrier destination, in response to determining that the article is unsuitable for sorting by the sorter, and
   the transmitter is configured to transmit the carrier control signal to the carrier,
   the sorter sorts the article to a predetermined sorting destination of a plurality of sorting destinations according to the sorting destination information corresponding to the article, and
   the carrier carries the article to a location corresponding to the predetermined sorting destination of the plurality of sorting destinations according to the sorting destination information corresponding to the article.

2. The article management device according to claim 1; wherein the processor is configured to select the carrier control signal containing destination point data corresponding to the carrier destination.

3. The article management device according to claim 2, wherein the processor is configured to convert the sorting destination information into the destination point data in response to determining that the article is unsuitable for sorting by the sorter.

4. The article management device according to claim 1, further comprising a storage configured to store the article identification information, and the sorting destination information associated with the article identification information.

5. An article management system comprising:
   the article management device according to claim 1;
   the sorter; and
   the carrier;
   wherein the sorter is configured to sort the article to a sorting destination based on the sorting destination information, and
   the carrier is configured to carry the article to the carrier destination based on the carrier control signal.

6. The article management system according to claim 5, wherein
   the carrier control signal contains destination point data corresponding to the carrier destination, and
   the carrier is configured to carry the article to the carrier destination corresponding to the sorting destination, based on the destination point data contained in the carrier control signal.

7. A non-transitory computer-readable storage medium storing a program for causing a computer to:
   select a first divergence control signal or a second divergence control signal based on article measurement information acquired from measuring an article, the first divergence control signal being for forwarding the article to a sorter configured to sort the article according to sorting destination information corresponding to the article, the second divergence control signal being for forwarding the article to a carrier configured to carry the article according to a carrier control signal;
   transmit the first or the second divergence control signal to a diverger configured to forward the article toward the sorter or the carrier;
   receive article identification information for identifying the article;
   select the sorting destination information associated with the article identification information in response to determining that the article is sortable by the sorter;
   transmit the sorting destination information to the sorter;
   select the carrier control signal for carrying the article to a carrier destination, in response to determining that the article is unsuitable for sorting by the sorter; and
   transmit the carrier control signal to the carrier;
   wherein the sorter sorts the article to a predetermined sorting destination of a plurality of sorting destinations according to the sorting destination information corresponding to the article, and
   wherein the carrier carries the article to a location corresponding to the predetermined sorting destination of the plurality of sorting destinations according to the sorting destination information corresponding to the article.

* * * * *